(12) United States Patent
Kim

(10) Patent No.: US 8,793,043 B2
(45) Date of Patent: Jul. 29, 2014

(54) HYBRID VEHICLE AND METHOD OF OPERATING ENGINE OF THE SAME

(75) Inventor: Jangheon Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 93 days.

(21) Appl. No.: 13/447,869

(22) Filed: Apr. 16, 2012

(65) Prior Publication Data

US 2013/0096750 A1    Apr. 18, 2013

(30) Foreign Application Priority Data

Oct. 18, 2011    (KR) .................. 10-2011-0106291

(51) Int. Cl.
| | |
|---|---|
| *B60L 9/00* | (2006.01) |
| *B60W 20/00* | (2006.01) |
| *B60K 6/24* | (2007.10) |
| *B60W 10/08* | (2006.01) |
| *B60W 10/06* | (2006.01) |
| *B60K 6/485* | (2007.10) |
| *F02D 41/30* | (2006.01) |

(52) U.S. Cl.
CPC .............. *B60K 6/24* (2013.01); *B60W 20/00* (2013.01); *Y02T 10/6295* (2013.01); *Y02T 10/6226* (2013.01); *F02D 41/3035* (2013.01); *Y02T 10/6286* (2013.01); *B60W 10/08* (2013.01); *B60W 10/06* (2013.01); *B60K 6/485* (2013.01)
USPC ........................................... 701/22; 701/113

(58) Field of Classification Search
USPC .......................................................... 701/22
See application file for complete search history.

(56) References Cited

U.S. PATENT DOCUMENTS

| | | | |
|---|---|---|---|
| 6,199,519 B1 | 3/2001 | Van Blarigan | |
| 6,536,407 B1 * | 3/2003 | Denbratt | ................. 123/311 |
| 7,694,760 B2 * | 4/2010 | Leone et al. | ............... 180/65.21 |
| 7,721,686 B2 | 5/2010 | Lindgarde | |
| 7,845,317 B2 | 12/2010 | Max et al. | |
| 2006/0150952 A1 * | 7/2006 | Yang et al. | ..................... 123/432 |
| 2006/0196456 A1 | 9/2006 | Hallenbeck | |
| 2007/0205029 A1 * | 9/2007 | Leone et al. | ................ 180/65.2 |
| 2008/0276913 A1 * | 11/2008 | Zubeck | ......................... 123/543 |
| 2009/0048762 A1 * | 2/2009 | Kang et al. | ...................... 701/103 |
| 2009/0229175 A1 * | 9/2009 | Shibata | ............................ 44/385 |
| 2009/0272363 A1 * | 11/2009 | Yun et al. | ....................... 123/295 |
| 2011/0011472 A1 * | 1/2011 | McLain et al. | ............. 137/624.12 |
| 2012/0035793 A1 * | 2/2012 | Kang et al. | ....................... 701/22 |

FOREIGN PATENT DOCUMENTS

| | | |
|---|---|---|
| JP | 2001241302 (A) | 9/2001 |
| JP | 2005539170 (A) | 12/2005 |
| JP | 2007532827 (A) | 11/2007 |
| JP | 2008-531915 A | 8/2008 |
| KR | 1020070029297 (A) | 3/2007 |
| KR | 1020090069163 (A) | 6/2009 |
| KR | 1020100136827 (A) | 12/2010 |

* cited by examiner

*Primary Examiner* — Hussein A. Elchanti
(74) *Attorney, Agent, or Firm* — Morgan, Lewis & Bockius LLP

(57) ABSTRACT

A hybrid vehicle may include a linear engine controlled by HCCI (Homogeneous Charge Compression Ignition) combustion in an operation section where an engine power may be used for generating electricity after being started and reaching up to a predetermined RPM, and a motor-combined generator engaged to the liner engine and starting the linear engine and charging a battery by converting an entire engine power of the linear engine generated by the HCCI combustion into electricity generation power.

11 Claims, 6 Drawing Sheets

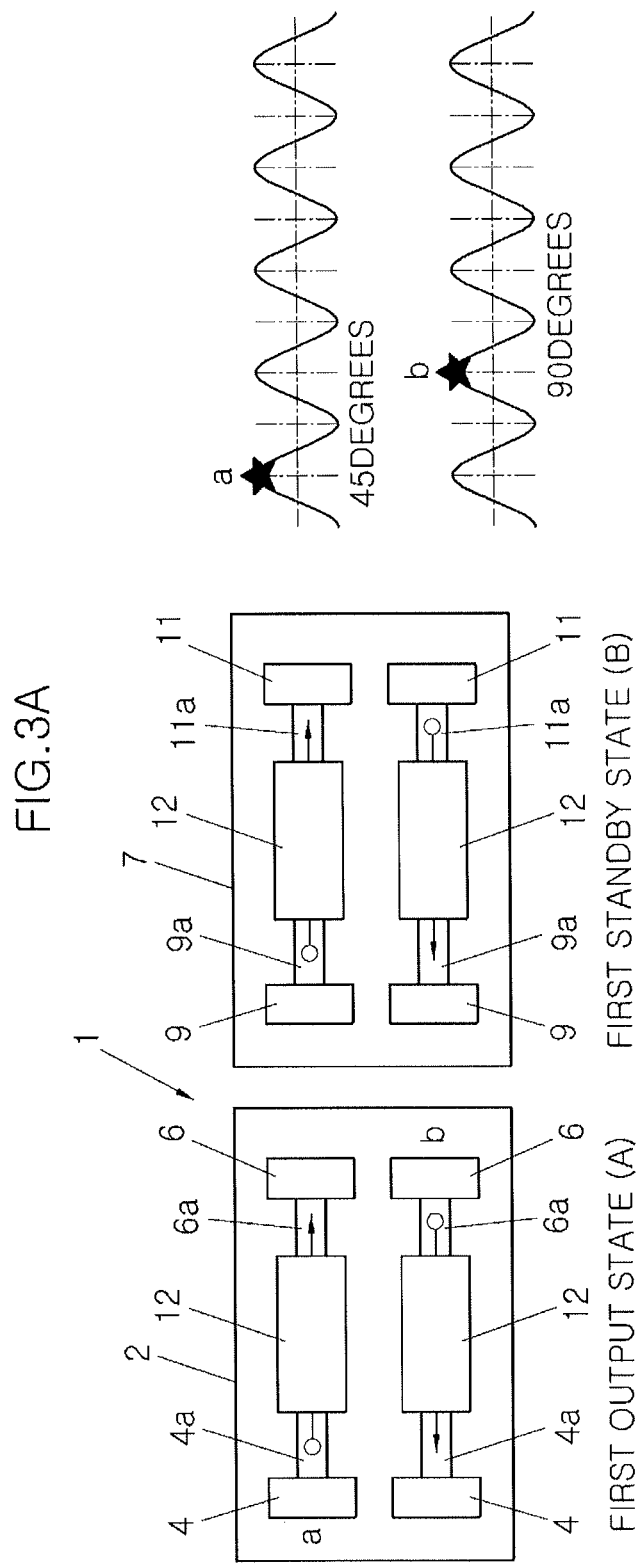

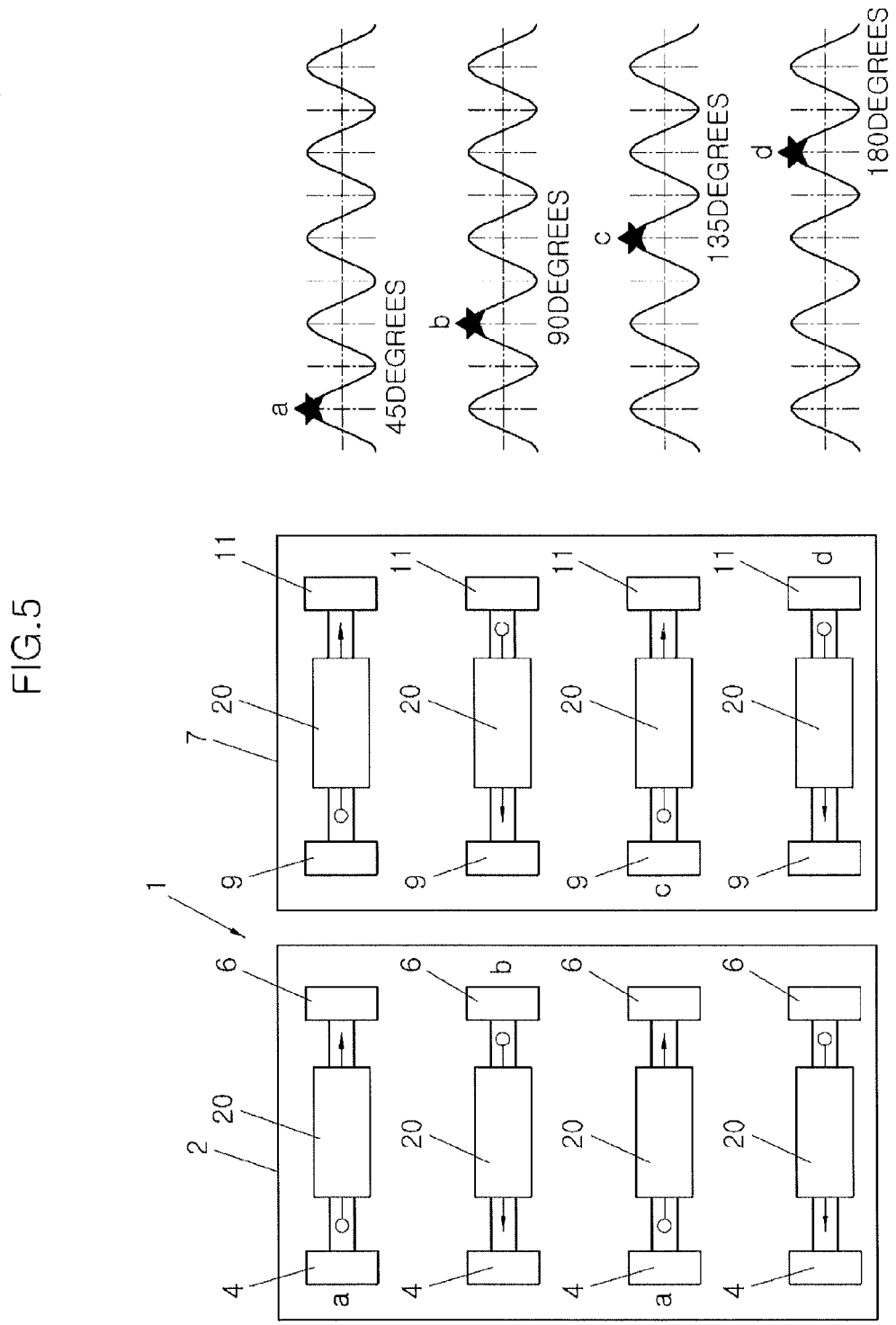

HYBRID VEHICLE AND METHOD OF
OPERATING ENGINE OF THE SAME

CROSS-REFERENCE TO RELATED APPLICATIONS

The present application claims priority to Korean Patent Application Number 10-2011-0106291 filed Oct. 18, 2011, the entire contents of which application is incorporated herein for all purposes by this reference.

BACKGROUND OF THE INVENTION

1. Field of the Invention

The present invention relates to a hybrid vehicle, and particularly, to a hybrid vehicle equipped with a four-stroke cycle linear engine that provides capacity for charging a high-capacity battery, using a HCCI (Homogeneous Charge Compression Ignition), and a method of operating the engine.

2. Description of Related Art

Hybrid vehicles that are manufactured for external environmental factors, such as eco-friendliness and high oil price necessarily have low output relatively to gasoline engines or diesel engines because the thermal efficiency of hydrogen fuel is low, but the low output of the engine can be compensated by a power distribution ratio similar to a motor or power distribution ratio biased to the motor due to the characteristics using the engine and the motor together.

Further, when a hybrid vehicle is equipped with a large-capacity battery, a high-output motor can be used and the performance of the vehicle can be greatly increased and the possibility of using apparatuses with various performances using electric power is largely increased, such that common use of the hybrid vehicle is made considerably earlier and the commercial quality can also be improved.

In general, since a large-capacity battery need to be continually charged so it needs a high-output power generator and the high-output power generator necessarily needs a high-output engine.

Therefore, a high-output engine must be mounted first in order to apply a large-capacity battery on a hybrid vehicle.

In general, it is possible to increase output by increasing the thermal efficiency of fuel, which is implemented by only ignition method without changing the engine structure, for example, HCCI (Homogeneous Charge Compression Ignition).

However, the HCCI combustion control is suitable for a diesel engine generating high pressure or a gasoline engine with lower compression pressure relatively to the diesel engine, but it generates a relative large power loss ratio to apply the HCCI combustion control to the engine of a hybrid vehicle, such that there is technical difficulty in practical use in terms of efficiency.

It is possible to somewhat minimize the power loss ratio of the engine described above by employing a two-stroke cycle type linear engine instead of a four-stroke cycle gasoline engine or a diesel engine in a hybrid vehicle.

However, the two-stroke cycle type linear engine has a limit in increasing the compression ratio for the characteristics in comparison with the gasoline engine or the diesel engine and the limit in increasing the compression ratio makes the HCCI combustion control impossible, such that HCCI combustion control is difficult to be applied in a hybrid vehicle.

That is, in a hybrid vehicle equipped with a two-stroke cycle type linear engine, the output of the power generator is necessarily low because the output of the engine is low, and a low-capacity battery is used, corresponding to the low-output power generator, such that it is difficult to overcome the limit in the related art, the decrease in performance and commercial quality of the hybrid vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a hybrid vehicle that uses the entire engine power generated by HCCI (Homogeneous Charge Compression Ignition) in a high-efficiency power generation section for capacity for charging a large-capacity battery, by implementing a four-stroke cycle with a set of two two-stroke cycle linear engines, and a method of operating an engine of the hybrid vehicle.

Various aspects of the present invention are directed to provide a hybrid vehicle that can easily ensure an increase in engine performance by arranging a pair of two two-stroke cycle linear engines for a four-stroke cycle in parallel to increase the number of cylinders of the engine, and a method of operating the engine.

in an aspect of the present invention, a hybrid vehicle may include a linear engine controlled by HCCI (Homogeneous Charge Compression Ignition) combustion in an operation section where engine power is not used for traveling power and electricity is generated with high efficiency after being started by a motor and reaching up to a predetermined RPM; and a motor-combined generator equipped with the motor and charging a large-capacity battery by converting the entire engine power of the linear engine which is generated by the HCCI combustion into electricity generation power.

The linear engine performs a four-stroke cycle by arranging two two-stroke cycle linear engines in parallel.

The two two-stroke cycle linear engines implementing the four-stroke cycle are made in a pair in parallel, such that the number of cylinders of the engine is increased.

The linear engine includes: a first linear engine where an expansion stroke due to explosion is generated at 45 degrees and 90 degrees in the entire stroke cycle; and a second linear engine that is arranged in parallel with the first linear engine and where an expansion stroke due to explosion is generated at 135 degrees and 180 degrees in the entire stroke cycle, in which the engine power of the first linear engine and the second linear engine is transmitted to a crank connected to the generator.

The first linear engine and the second linear engine have the same configuration and are connected to the crank.

The first linear engine and the second linear engine include combustion chambers formed at both left and right sides of the crank and connected with a cylinder head for combustion of fuel and air, and pistons disposed in the combustion chambers and connected to the crank by connecting rods, respectively.

An expansion stroke is generated at a crank angle of 45 degrees in one of the combustion chambers of the first linear engine and an expansion stroke is generated at a crank angle of 90 degrees in the opposite combustion chamber, and an expansion stroke is generated at a crank angle of 135 degrees in one of the combustion chambers of the second linear engine and an expansion stroke is generated at a crank angle of 180 degrees in the opposite combustion chamber.

The cylinder head includes a fuel injection device, a valve train, and various devices for discharging exhaust products.

In another aspect of the present invention, a method of operating an engine of a hybrid vehicle, may include determining whether an HCCI (Homogeneous Charge Compression Ignition) operation condition is satisfied after checking the engine RPM and engine temperature; performing control such that an expansion stroke is generated at a crank angle of 45 degrees in one combustion chamber of a first linear engine, an expansion stroke is generated at a crank angle of 90 degrees in the opposite combustion chamber, an expansion stroke is generated at a crank angle of 135 degrees in one combustion chamber of a second linear engine arranged in parallel with the first linear engine, and an expansion stroke is generated at a crank angle of 180 degrees in the opposite combustion chamber, when the HCCI operation condition is satisfied; determining whether to change the engine operation condition by using a frequency stability state of a motor-combined generator generating electricity through a crank in accordance with the HCCI operation control; and maintaining the HCCI operation control in the performing of control when the engine operation condition is not changed, and applying a condition value changed when the engine operation condition is changed to the performing of condition.

The HCCI operation condition is a high-efficiency power operation section using the entire engine power not for traveling power, but electricity generation power of the motor-combined generator.

The method further includes determining whether it is an electricity generation condition when the HCCI operation condition is not satisfied, determining whether it is a start condition when the electricity generation condition is not satisfied, starting an engine when it is the electricity generation condition or the start condition, and shifting to an engine stop state when it is the start condition.

The engine is started by a motor mounted in the motor-combined generator.

The engine operation condition is an engine correction factor and the engine correction factor includes an engine injection timing and the amount of fuel.

According to exemplary embodiments of the present invention, it is possible to improve vehicle performance for using a large-capacity battery and greatly increase commercial quality by converting the entire engine power by HCCI (Homogeneous Charge Compression Ignition) from a linear engine into power capacity for charging the large-capacity battery.

According to exemplary embodiments of the present invention, it is possible to considerably reduce power a consumption ratio of cranks in comparison to a gasoline engine or a diesel engine by implementing a four stroke cycle by putting two two-stroke cycle linear engines in a pair, and particularly, it is possible to easily increase the output of a hybrid vehicle by increasing the number of cylinders in an engine by arranging two two-stroke cycle linear engine in parallel in a pair.

According to exemplary embodiments of the present invention, since the linear engine is operated by the HCCI type for charging a large-capacity battery, it is possible to largely improve cleanness of combustion even in a linear engine through high efficiency and low emission.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 5 is a view showing a four-stroke cycle of the linear engine mounted in a hybrid vehicle according to an exemplary embodiment of the present invention.

Figure 1:
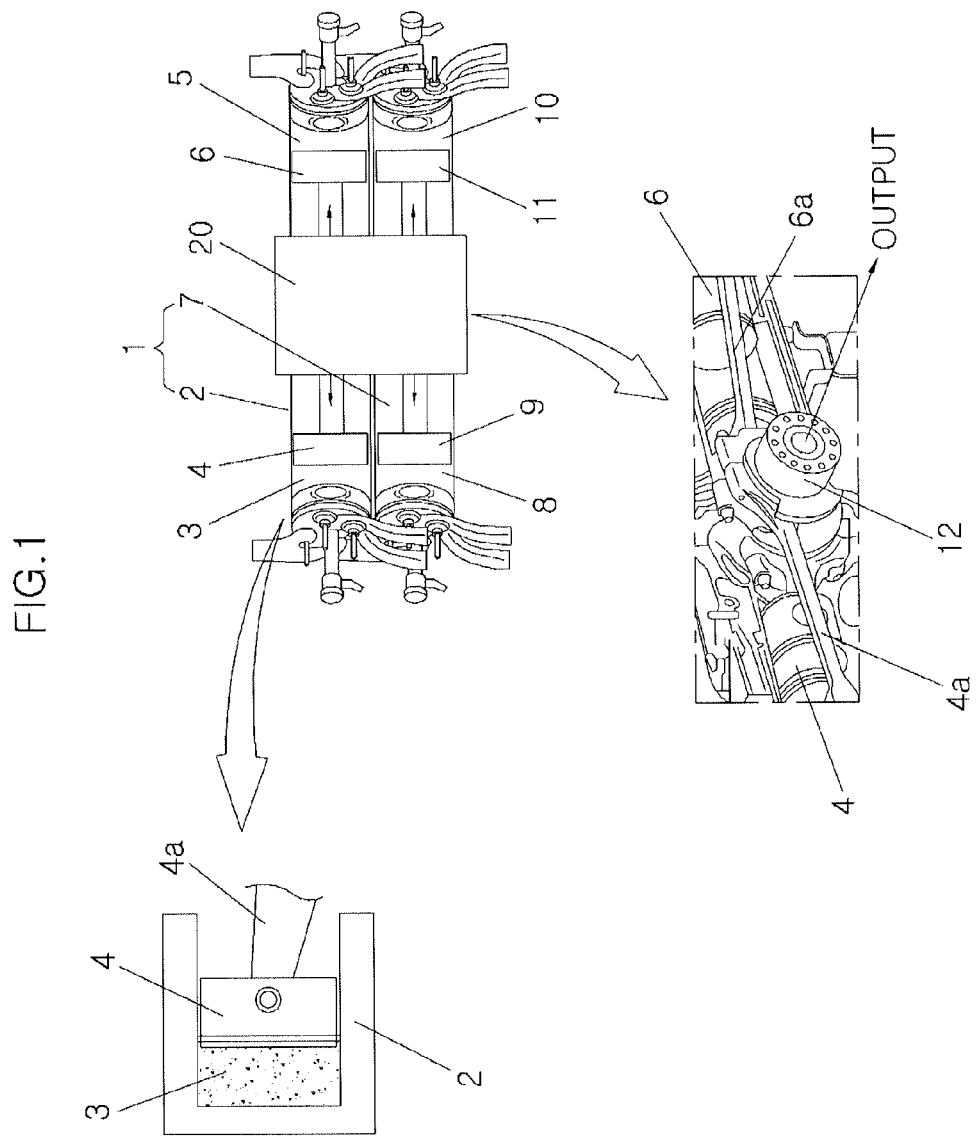
FIGS. 1 and 2 are views showing the engine configuration of a hybrid vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention are described hereafter in detail with reference to the accompanying drawings, and the exemplary embodiments can be achieved in various ways by those skilled in the art and the present invention is not limited to the exemplary embodiments.

FIG. 1 shows a four-stroke cycle linear engine 1 mounted in a hybrid vehicle according to an exemplary embodiment of the present invention.

As shown in FIG. 1, a four-stroke cycle linear engine 1 includes a first linear engine 2 where an expansion stroke due to explosion is performed at 45 degrees and 90 degrees in the entire stroke cycle, a second linear engine 7 that is arranged in parallel with the first linear engine 2 and where an expansion stroke due to explosion at 135 degrees and 180 degrees in the entire stroke cycle, a crank 12 that extracts the engine power generated by the stroke cycles of the first and second linear engines 2 and 7, and a motor-combined generator 20 that starts the engines by operating the crank 12, generates traveling power with HCCI combustion in a high-efficiency power operation section and generates power capacity for charging a large-capacity battery in the other operation sections.

Hereby, HCCI is an abbreviation of Homogeneous Charge Compression Ignition, which means homogeneous compression ignition combustion.

And, the motor-combined generator 20 is a power generator and also operates as a motor increasing the number of revolution of an engine up to a predetermined RPM.

A cylinder head is disposed at both left and right ends of a combustion chambers 3, 5, 8, and 10 and the four-stroke cycle linear engine 1 has a structure similar to that of a common diesel engine by being equipped with a fuel injection device and a valve train for intake combustion of fuel and air and a manifold for discharging exhaust products at the cylinder heads.

It is possible to easily increase the capacity of the four-stroke cycle linear engine 1 by making the first linear engine 2 and second linear engines 7, which are arranged in parallel, into a pair, and arranging them to be adjacent to each other in parallel.

Figure 2:
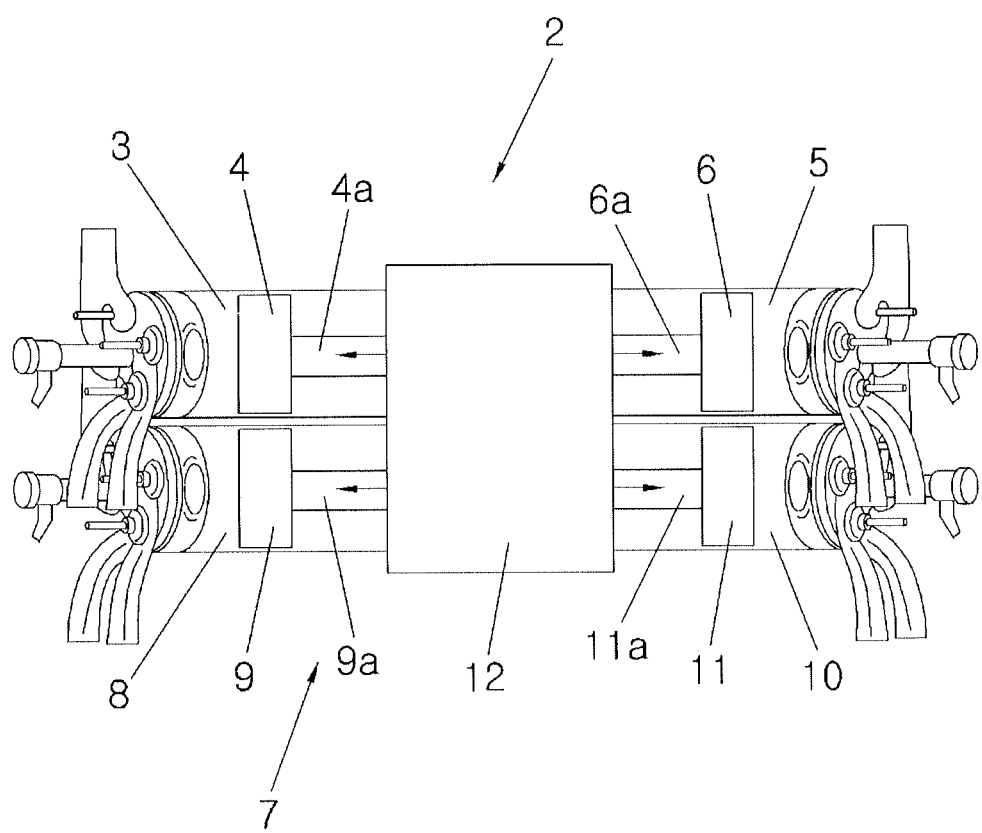

FIG. 2 shows a linear engines 2 and 7 according to an exemplary embodiment of the present invention.

As shown in FIG. 2, the first linear engine 2 includes combustion chambers 3 and 5 at left and right sides where fuel and air are burned, in which a first L piston 4 is disposed at a combustion chamber 3 (left side in FIG. 2) of the combustion chambers 3 and 5 while a first R piston 6 is disposed at the combustion chamber 5 at the opposite side (right side in FIG. 2), and a connecting rod 4a connected to first L piston 4 and a connecting rod 6a connected to first R piston 6 are disposed at the center therebetween to extract the engine power and connected to crank 12 coupled to the motor-combined generator 20.

The second linear engine 7 includes combustion chambers 8 and 10 at left and right sides where fuel and air are burned, in which a second L piston 9 is disposed at the combustion chamber 8 (left side in FIG. 2) of the combustion chambers 8 and 10 while a second R position 11 is disposed at combustion chamber 10 at the opposite side (right side in FIG. 2), and a connecting rod 9a connected to second L piston 9 and a connecting rod 11a connected to second R piston 11 are disposed at the center therebetween to extract the engine power and connected to a crank 12 coupled to the motor-combined generator 20.

The first linear engine 2 and second linear engine 7 are arranged in parallel and expansion strokes due to explosion are generated at 45 degrees, 90 degrees, 135 degrees, and 180 degrees, which makes the minimum unit of the four-stroke cycle linear engine 1.

The angles of 45 degrees, 90 degrees, 135 degrees, and 180 degrees are crank angles.

FIG. 3 shows an operation of the engine mounted in a hybrid vehicle according to an exemplary embodiment of the present invention.

FIG. 3A shows a process when the first linear engine 2 generates explosion strokes at 45 degrees and 90 degrees, in which when an expansion stroke (a) due to explosion is generated in the combustion engine 3 at 45 degrees in the entire stroke cycle, the first L piston 4 of combustion chamber 3 is pushed and the connecting rod 4a connected thereto rotates crank 12.

The crank 12 rotated as described above operates the connecting rod 6a, which is connected thereto, and the connecting rod 6a pushes the first R piston 6 connected thereto, such that a compression stroke for discharging an exhaust gas is generated in the combustion chamber 5.

Next, when the stroke cycle reaches 90 degrees after the compression stroke in the combustion chamber 5, another expansion stroke (b) due to the explosion is generated in the combustion chamber 5, such that the first R piston 6 is pushed and the connecting rod 6a connected thereto adds rotation force to the rotating crank 12.

The crank 12 rotated, as described above, by the expansion stroke (b) in the combustion chamber 5 operates the connecting rod 4a, which is connected thereto, and the connecting rod 4a pushes the first L piston 4 connected thereto, such that a compression stroke for discharging an exhaust gas is generated in the combustion chamber 3.

As described above, as the expansion strokes (a, b) are continuously generated in the combustion chamber 3 and the combustion chamber 5, respectively, in the first linear engine 2 at 45 degrees and 90 degrees in the entire stroke cycle, crank 12 is rotated and the first linear engine 2 is shifted to a first output state A.

At this time, the first output state (A) means traveling power for the vehicle or electricity generation power of the motor-combined generator 20.

However, the second linear engine 7 keeps a first standby state B without generating an expansion stroke at 45 degrees and 90 degrees in the entire stroke cycle.

And the first standby state B means a state in which an intake stroke suctioning fuel and air is generated in the combustion chamber 8 while an exhaust stroke discharging an exhaust gas is generated in the combustion chamber 10 at the opposite side at 45 degrees in the entire stroke cycle in the second linear engine 7, whereas an exhaust stroke discharging an exhaust gas is generated in the combustion chamber 8 while intake stroke suctioning fuel and air is generated in the combustion chamber 10 at 90 degrees in the entire stroke cycle.

Figure 3B:
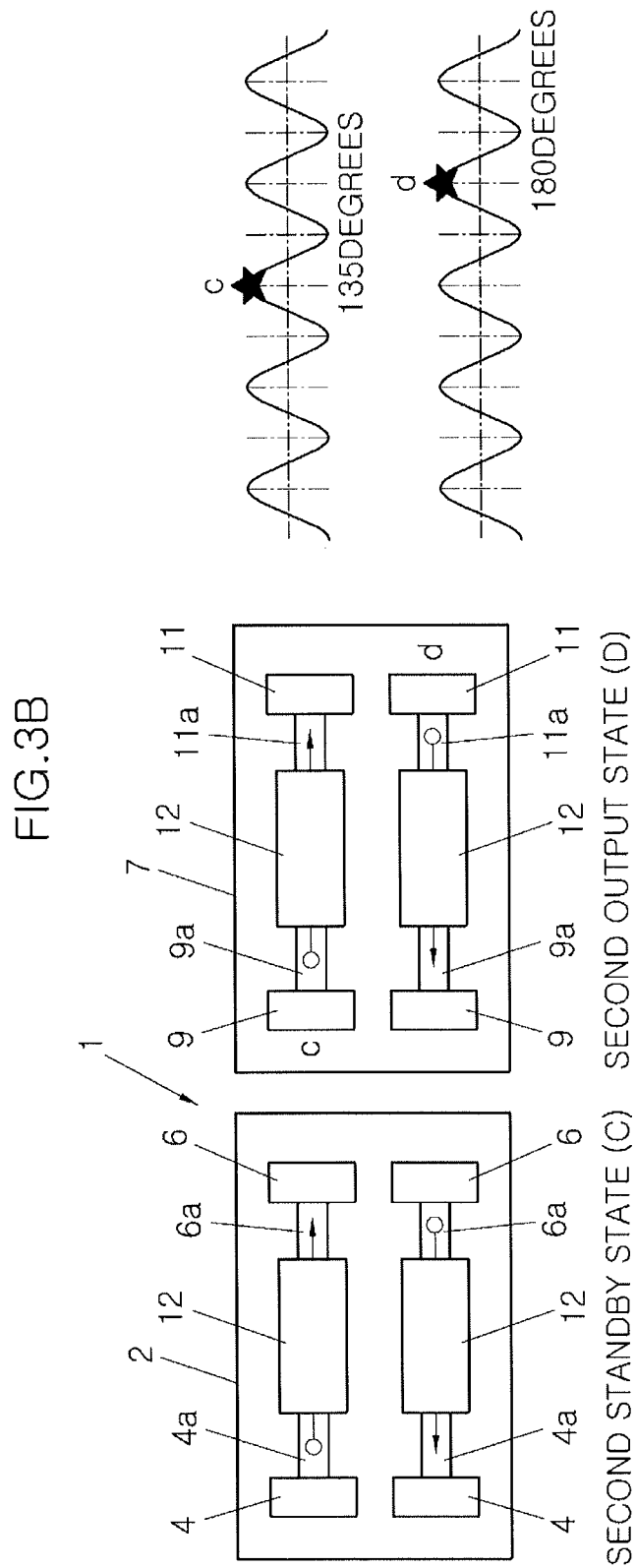
FIG. 3 is a view showing an operation of the engine mounted in a hybrid vehicle according to an exemplary embodiment of the present invention.

Meanwhile, FIG. 3B shows a process when the second linear engine 7 generates explosion strokes at 135 degrees and 180 degrees, in which when an expansion stroke (c) due to explosion is generated in the combustion chamber 8 at 135 degrees in the entire stroke cycle, the second L piston 9 of the combustion chamber 8 is pushed and the connecting rod 9a connected thereto adds rotation force to the rotating crank 12.

The crank 12 rotated as described above operates the connecting rod 11a, which is connected thereto, and the connecting rod 11a pushes the second R piston 11 connected thereto, such that a compression stroke for discharging an exhaust gas is generated in the combustion chamber 10.

Next, when the stroke cycle reaches 180 degrees after the compression stroke in the combustion chamber 5, another expansion stroke (d) due to the explosion is generated in the combustion chamber 10, such that the second R piston 11 is pushed and the connecting rod 11a connected thereto adds rotation force to the rotating crank 12.

The crank 12 rotated, as described above, by the expansion stroke (d) in the combustion chamber 10 operates the connecting rod 9a, which is connected thereto, and the connecting rod 9a pushes the second L piston 9 connected thereto, such that a compression stroke for discharging an exhaust gas is generated in the combustion chamber 8.

As described above, as the expansion strokes (c, d) are continuously generated in the combustion chamber 8 and the combustion chamber 10, respectively, in the second linear engine 7 at 135 degrees and 180 degrees in the entire stroke cycle, the crank 12 is rotated and the second linear engine 7 is shifted to a second output state C.

At this time, the second output state D means traveling power for the vehicle or electricity generation power of the motor-combined generator 20.

On the contrary, the first linear engine 2 keeps a second standby state C without generating an expansion stroke at 135 degrees and 180 degrees in the entire stroke cycle.

The second standby state C means a state in which an intake stroke suctioning fuel and air is generated in the combustion chamber 3 while an exhaust stroke discharging an exhaust gas is generated in the combustion chamber 5 at the opposite side at 135 degrees in the entire stroke cycle in the first linear engine 2, whereas an exhaust stroke discharging an exhaust gas is generated in the combustion chamber 3 while intake stroke suctioning fuel and air is generated in combustion chamber 5 at 180 degrees in the entire stroke cycle.

Therefore, it is possible to sufficiently charge a large-capacity battery with the electricity generation power of the motor-combined generator 20.

Figure 4:
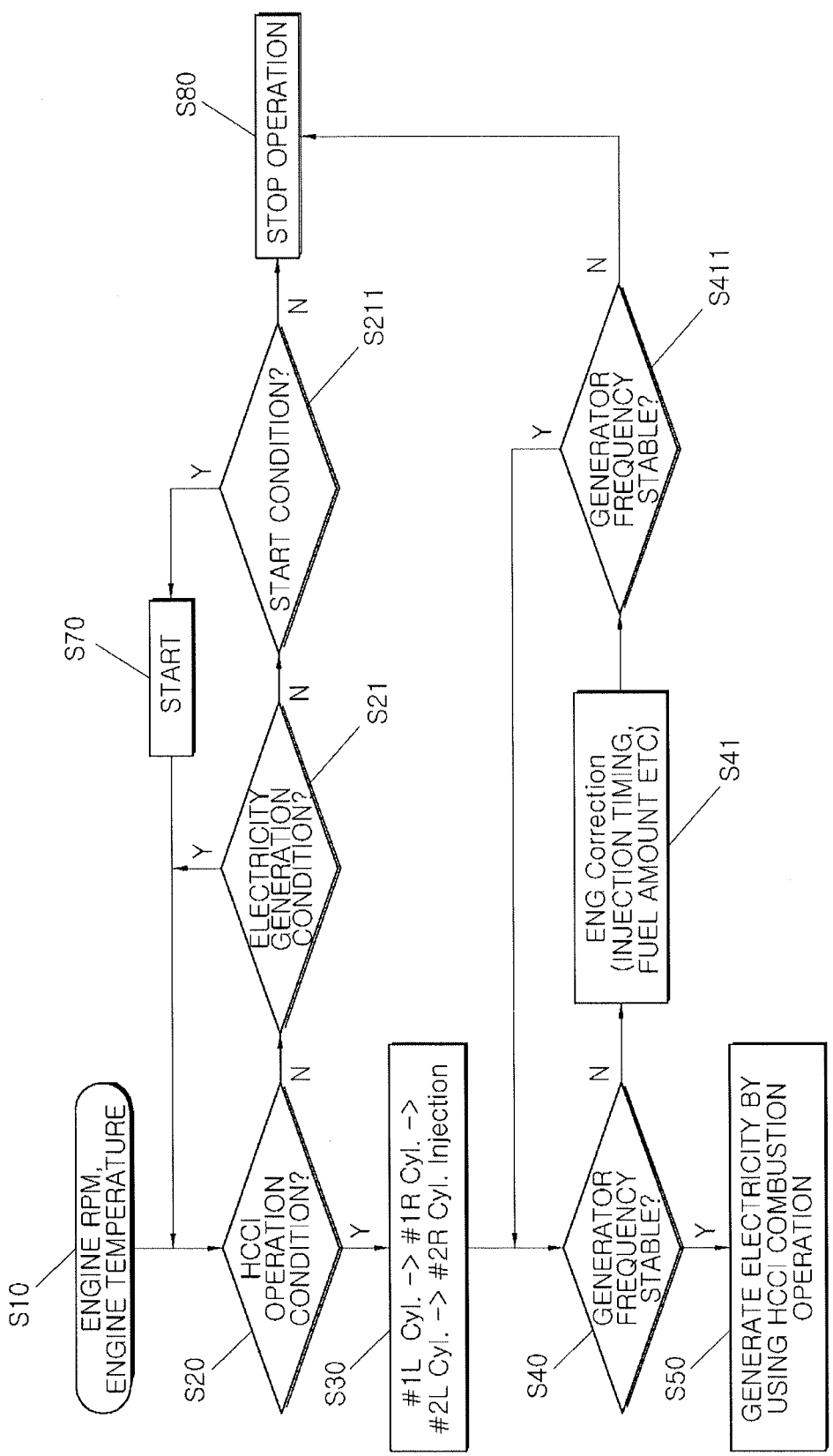
FIG. 4 is diagram showing an operation logic of a linear engine mounted in a hybrid vehicle according to an exemplary embodiment of the present invention.

FIG. 4 shows a flow chart controlling a first linear engine 2 and a second linear engine 7 according to an exemplary embodiment of the present invention.

As the operation logic of an engine is executed, as in step S10, the engine RPM and the engine temperature are checked first, and then whether an HCCI (Homogeneous Charge Compression Ignition) operation condition is satisfied in step S20.

The HCCI is a combustion type that can satisfy high-level efficiency of a direct injection type of diesel engine while generating nitrogen oxide NOx and particle materials P and M at a very low level, by achieving high efficiency where reaction and combustion are generated throughout the combustion chambers by suctioning and compressing a mixture of rarefied fuel and air in the combustion chambers.

The HCCI operation condition that is checked in step S20 means a high-efficiency power operation section where the entire engine power is used for not the traveling power, but the electricity generation power of motor-combined generator 20.

However, when the HCCI operation condition is not satisfied with a result of the checking in step S20, whether it is a power generation condition in step S21 is determined, and then when it is not the power generation condition, whether it is a start condition is satisfied in step S211.

And, control for starting the engine is performed in step S70, when it is the power generation condition is satisfied in step S21 and it is the start condition in step S211.

The start is performed by a motor mounted on motor-combined generator 20.

However, when it is not the start condition in step S211, an operation stop state is implemented as in step S80, which means stopping and initializing of all the control logics.

Meanwhile, when the HCCI operation condition is satisfied with a result of the check in step S20, HCCI type operation is performed as step S30 while the stroke cycles of the first linear engine 2 and second linear engine 7 are controlled.

FIG. 5 shows the stroke cycles of the first linear engine 2 and second linear engine 7 in the HCCI type operation.

As shown in FIG. 5, the expansion stroke (a) and the expansion stroke (b) are continuously generated at 45 degrees and 90 degrees in the entire stroke cycle in the combustion chamber 3 and the combustion chamber 5, respectively, in the first linear engine 2, such that the crank 12 is rotated, while the expansion stroke (c) and the expansion stroke (d) are continuously generated at 135 degrees and 180 degrees in the entire stroke cycle in the combustion chamber 8 and the combustion chamber 10, respectively, in the second linear engine 7, such that the crank 12 is rotated.

Therefore, the expansion strokes (a, b, c, and d) are generated in the four combustion chambers 3, 5, 8, and 10 at a cycle of 180 degrees in the four-stroke cycle linear engine 1 in which the first linear engine 2 and the second linear engine 7 are arranged in parallel, such that electricity generation power of the motor-combined generator 20 and power for keeping the combustion cycle can be generated.

Accordingly, the motor-combined generator 20 can have a sufficient power capacity for charging a large-capacity battery.

Next, step S40 is a process of determining whether to change the engine operation condition by checking the electricity generation state of the motor-combined generator 20 in the HCCI operation control, and the frequency stability state of the motor-combined generator 20 is checked for the process.

When the frequency stability state of the motor-combined generator 20 is not maintained, as a result of the determination in step S40, the HCCI operation control is performed by changing the engine operation condition in step S41, and then the frequency stability state of the motor-combined generator 20 according to the newly performed HCCI operation control is checked as in step S411.

Changing of the engine operation condition means that engine correction factors, such as a fuel injection timing and the fuel amount, are changed and newly applied.

When the frequency of the motor-combined generator 20 does not maintain the stable state, as a result of the checking in step S411, the operation is stopped in step S80.

This means stopping and initializing of all the control logics.

On the contrary, when the frequency of the motor-combined generator 20 maintains the stable state, as a result of the checking in step S411, the HCCI operation control is continued, corresponding to the engine operation condition that is newly applied.

On the other hand, when the frequency of the motor-combined generator 20 maintains the stable state, as a result of the determination in step S40, the HCCI operation control is continued in accordance with the present condition as in step S50.

Since the engine is under HCCI operation control, as described above, the thermal efficiency is excellent in comparison to a diesel engine under a predetermined RPM and a predetermined load, even though the linear engines 2 and 7 are used, and particularly, it was proved by experiments that it is possible to achieve high efficiency and low EM with a row compression ratio, an porous nozzle, and a low swirl cylinder head.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid vehicle comprising:
   a linear engine controlled by HCCI (Homogeneous Charge Compression Ignition) combustion in an operation section where an engine power is used for generating electricity after being started and reaching up to a predetermined RPM; and
   a motor-combined generator engaged to the liner engine and starting the linear engine and charging a battery by converting an entire engine power of the linear engine generated by the HCCI combustion into electricity generation power;

wherein the linear engine performs a four-stroke cycle by putting two two-stroke cycle linear engines in parallel; and wherein the linear engine includes:

a first linear engine where an expansion stroke due to explosion is generated at 45 degrees and 90 degrees in an entire stroke cycle; and a second linear engine that is arranged in parallel with the first linear engine and where an expansion stroke due to explosion is generated at 135 degrees and 180 degrees in the entire stroke cycle, wherein the engine power of the first linear engine and the second linear engine is transmitted to a crank connected to the motor-combined generator.

2. The hybrid vehicle as defined in claim 1, wherein the two two-stroke cycle linear engines implementing the four-stroke cycle are made in a pair in parallel, such that the number of cylinders of the engine is increased.

3. The hybrid vehicle as defined in claim 1, wherein the first linear engine and the second linear engine have the same configuration and are connected to the crank.

4. The hybrid vehicle as defined in claim 1, wherein the first linear engine and the second linear engine include:

combustion chambers formed at both left and right sides of the crank and connected with a cylinder head for combustion of fuel and air; and pistons disposed in the combustion chambers and connected to the crank by connecting rods, respectively.

5. The hybrid vehicle as defined in claim 4, wherein an expansion stroke is generated at a crank angle of 45 degrees in one of the combustion chambers of the first linear engine and an expansion stroke is generated at a crank angle of 90 degrees in an opposite combustion chamber of the first linear engine, and an expansion stroke is generated at a crank angle of 135 degrees in one of the combustion chambers of the second linear engine and an expansion stroke is generated at a crank angle of 180 degrees in an opposite combustion chamber of the second linear engine.

6. The hybrid vehicle as defined in claim 4, wherein the cylinder head includes a fuel injection device, a valve train, and various devices for discharging exhaust products.

7. A method of operating an engine of a hybrid vehicle, comprising:

determining whether an HCCI (Homogeneous Charge Compression Ignition) operation condition is satisfied after checking an engine RPM and an engine temperature;

performing control such that an expansion stroke is generated at a crank angle of 45 degrees in a combustion chamber of a first linear engine, an expansion stroke is generated at a crank angle of 90 degrees in an opposite combustion chamber of the first linear engine, an expansion stroke is generated at a crank angle of 135 degrees in a combustion chamber of a second linear engine arranged in parallel with the first linear engine, and an expansion stroke is generated at a crank angle of 180 degrees in an opposite combustion chamber of the second linear engine, when the HCCI operation condition is satisfied;

determining whether to change an engine operation condition by using a frequency stability state of a motor-combined generator generating electricity through a crank in accordance with the HCCI operation control; and maintaining the HCCI operation control in the performing of control when the engine operation condition is not changed, and applying a condition value changed when the engine operation condition is changed to the performing of condition.

8. The method as defined in claim 7, wherein the HCCI operation condition is a high-efficiency power operation section using the entire engine power not for traveling power, but electricity generation power of the motor-combined generator.

9. The method as defined in claim 7, further including:

determining whether an electricity generation condition is satisfied when the HCCI operation condition is not satisfied;

determining whether a start condition is satisfied when the electricity generation condition is not satisfied; and starting the engine when the electricity generation condition or the start condition is satisfied, and shifting to an engine stop state when the electricity generation condition and the start condition are not satisfied.

10. The method as defined in claim 9, wherein the engine is started by a motor mounted in the motor-combined generator.

11. The method as defined in claim 7, wherein the engine operation condition is an engine correction factor and the engine correction factor includes an engine injection timing and an amount of fuel.

* * * * *